US012663614B2

(12) United States Patent
Jang et al.

(10) Patent No.: US 12,663,614 B2
(45) Date of Patent: Jun. 23, 2026

(54) OPTICAL IMAGING SYSTEM

(71) Applicant: Samsung Electro-Mechanics Co., Ltd., Suwon-si (KR)

(72) Inventors: Sang Hyun Jang, Suwon-si (KR); Dong Hyuk Jang, Suwon-si (KR); Ju Hwa Son, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 733 days.

(21) Appl. No.: 17/143,447

(22) Filed: Jan. 7, 2021

(65) Prior Publication Data

US 2022/0091394 A1 Mar. 24, 2022

(30) Foreign Application Priority Data

Sep. 18, 2020 (KR) ........................ 10-2020-0120733

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/18; G02B 13/0015; G02B 2003/0093; G03B 17/12; H04N 23/55
USPC ................................................. 359/756, 713
See application file for complete search history.

(56) References Cited

U.S. PATENT DOCUMENTS

| | | | |
|---|---|---|---|
| 10,310,217 | B1 | 6/2019 | Teraoka et al. |
| 10,739,560 | B2 | 8/2020 | Nitta |
| 10,809,498 | B2 | 10/2020 | Kubota et al. |
| 10,935,767 | B2 | 3/2021 | Kubota et al. |
| 11,106,012 | B2 | 8/2021 | Chen |

(Continued)

FOREIGN PATENT DOCUMENTS

| | | |
|---|---|---|
| CN | 104076492 A | 10/2014 |
| CN | 104238081 A | 12/2014 |

(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007) (Year: 2007).*

(Continued)

*Primary Examiner* — Thomas K Pham
*Assistant Examiner* — Jennifer A Jones
(74) *Attorney, Agent, or Firm* — NSIP Law

(57) ABSTRACT

An optical imaging system includes a first lens having refractive power, a second lens having refractive power and having a convex object-side surface, a third lens having refractive power and having a convex object-side surface, a fourth lens having refractive power, a fifth lens having refractive power, and a sixth lens having negative refractive power. The optical imaging system satisfies $100°\leq FOV$, and $-2.0 < \{IMGHT/(f*\tan(FOV/2))-1\}*100 < 2.0$, where FOV is a field of view of the optical imaging system, IMGHT is half of a diagonal length of an imaging plane, and f is a focal length of the optical imaging system.

16 Claims, 10 Drawing Sheets

(56) References Cited

U.S. PATENT DOCUMENTS

| | | | |
|---|---|---|---|
| 11,378,782 B2 * | 7/2022 | Liao | G02B 13/0045 |
| 2014/0071542 A1 | 3/2014 | Jung et al. | |
| 2014/0293441 A1 | 10/2014 | Inomoto et al. | |
| 2014/0368927 A1 * | 12/2014 | Hsu | G02B 5/208 |
| | | | 359/713 |
| 2015/0124332 A1 | 5/2015 | Noda et al. | |
| 2015/0177482 A1 | 6/2015 | Bone et al. | |
| 2016/0018627 A1 | 1/2016 | Lee | |
| 2016/0116715 A1 | 4/2016 | Ota | |
| 2016/0178871 A1 | 6/2016 | You | |
| 2016/0299317 A1 | 10/2016 | Ikegaya | |
| 2017/0031134 A1 | 2/2017 | Liu et al. | |
| 2017/0052348 A1 | 2/2017 | Tang et al. | |
| 2017/0108666 A1 | 4/2017 | Lee | |
| 2017/0184817 A1 | 6/2017 | Lee | |
| 2017/0235102 A1 | 8/2017 | Lai et al. | |
| 2017/0276909 A1 | 9/2017 | Jung et al. | |
| 2018/0024322 A1 | 1/2018 | Chen et al. | |
| 2018/0059378 A1 | 3/2018 | Kubota et al. | |
| 2018/0172954 A1 | 6/2018 | Bone et al. | |
| 2018/0172955 A1 | 6/2018 | Bone et al. | |
| 2018/0259746 A1 | 9/2018 | Fukaya et al. | |
| 2019/0011672 A1 | 1/2019 | Nitta | |
| 2019/0033556 A1 | 1/2019 | Tang et al. | |
| 2019/0049699 A1 | 2/2019 | Tabata | |
| 2019/0064485 A1 | 2/2019 | Arita | |
| 2019/0179118 A1 | 6/2019 | Kubota et al. | |
| 2019/0179119 A1 | 6/2019 | Kubota et al. | |
| 2019/0285843 A1 | 9/2019 | Chang et al. | |
| 2019/0285858 A1 | 9/2019 | Hsu et al. | |
| 2019/0302417 A1 | 10/2019 | Liao et al. | |
| 2020/0018927 A1 | 1/2020 | Chen et al. | |
| 2020/0057246 A1 | 2/2020 | Kenji et al. | |
| 2020/0057268 A1 | 2/2020 | Chen et al. | |
| 2020/0096734 A1 | 3/2020 | Hsueh et al. | |
| 2020/0209540 A1 | 7/2020 | Sun et al. | |
| 2020/0209580 A1 | 7/2020 | Ji et al. | |
| 2020/0209586 A1 | 7/2020 | Guo et al. | |
| 2020/0209590 A1 | 7/2020 | Sun | |
| 2020/0241253 A1 * | 7/2020 | Hsueh | G02B 27/0025 |
| 2020/0241256 A1 | 7/2020 | Lee | |
| 2020/0249442 A1 | 8/2020 | You et al. | |
| 2020/0326510 A1 * | 10/2020 | Chen | G02B 13/02 |
| 2020/0393655 A1 | 12/2020 | Liao et al. | |
| 2021/0018726 A1 | 1/2021 | Feng et al. | |
| 2021/0048640 A1 * | 2/2021 | Zhu | G02B 9/64 |
| 2021/0072510 A1 | 3/2021 | Lu et al. | |
| 2021/0132338 A1 | 5/2021 | Lin et al. | |
| 2021/0157093 A1 | 5/2021 | Zhu et al. | |
| 2021/0199924 A1 | 7/2021 | Jhang et al. | |
| 2021/0255424 A1 * | 8/2021 | Weng | G02B 9/62 |
| 2021/0278631 A1 * | 9/2021 | Lai | G02B 3/04 |
| 2022/0011548 A1 | 1/2022 | Li | |

FOREIGN PATENT DOCUMENTS

| | | | | |
|---|---|---|---|---|
| CN | 106054355 A | 10/2016 | | |
| CN | 106468820 A | 3/2017 | | |
| CN | 106918898 A | 7/2017 | | |
| CN | 107797241 A | 3/2018 | | |
| CN | 108333714 A | 7/2018 | | |
| CN | 208888459 U | 5/2019 | | |
| CN | 208888460 U | 5/2019 | | |
| CN | 109856780 A | 6/2019 | | |
| CN | 109917532 A | 6/2019 | | |
| CN | 109917533 A | 6/2019 | | |
| CN | 110187479 A | 8/2019 | | |
| CN | 110187483 A | 8/2019 | | |
| CN | 110297307 A | 10/2019 | | |
| CN | 110426828 A | 11/2019 | | |
| CN | 110579863 A | 12/2019 | | |
| CN | I722839 B * | 3/2020 | | G02B 13/0045 |
| CN | 111025580 A | 4/2020 | | |
| CN | 111077658 A | 4/2020 | | |
| CN | 111208628 A | 5/2020 | | |
| CN | 111338058 A | 6/2020 | | |
| CN | 111367055 A | 7/2020 | | |
| CN | 111399189 A | 7/2020 | | |
| CN | 211123446 U | 7/2020 | | |
| CN | 111538140 A | 8/2020 | | |
| CN | 111596439 A | 8/2020 | | |
| EP | 2 749 925 A1 | 7/2014 | | |
| JP | 2016-85390 A | 5/2016 | | |
| JP | 6194134 B1 | 9/2017 | | |
| JP | 2018-36316 A | 3/2018 | | |
| JP | 2018-66978 A | 4/2018 | | |
| JP | 2019-35828 A | 3/2019 | | |
| JP | 2019-120923 A | 7/2019 | | |
| JP | 2020-109473 A | 7/2020 | | |
| JP | 2020-109492 A | 7/2020 | | |
| JP | 2020-109493 A | 7/2020 | | |
| KR | 10-2014-0034040 A | 3/2014 | | |
| KR | 10-2016-0075015 A | 6/2016 | | |
| KR | 10-2017-0109858 A | 10/2017 | | |
| KR | 10-2019-0024732 A | 3/2019 | | |
| TW | M471594 U | 2/2014 | | |
| TW | 201604576 A | 2/2016 | | |
| TW | 201804199 A | 2/2018 | | |
| TW | 201809783 A | 3/2018 | | |
| TW | I617860 B | 3/2018 | | |
| TW | 201910848 A | 3/2019 | | |
| TW | I671565 B | 9/2019 | | |
| TW | 201939092 A | 10/2019 | | |
| TW | I673536 E | 10/2019 | | |
| TW | 201942623 A | 11/2019 | | |
| TW | 202006416 A | 2/2020 | | |
| TW | 202009536 A | 3/2020 | | |
| TW | I722839 B * | 3/2020 | | G02B 11/32 |
| TW | I698673 B | 7/2020 | | |
| TW | I699549 B | 7/2020 | | |
| TW | 202037957 A * | 10/2020 | | G02B 13/0045 |
| TW | I706185 B | 10/2020 | | |
| TW | 202045971 A | 12/2020 | | |
| TW | I734356 B | 7/2021 | | |
| WO | WO 2019/227877 A1 | 12/2019 | | |

OTHER PUBLICATIONS

Korean Office Action issued on Jun. 1, 2023, in counterpart Korean Patent Application No. 10-2022-0133153 (7 pages in English, 5 pages in Korean).

Chinese Office Action Issued on Nov. 24, 2022, in counterpart of Chinese Patent Application No. 202210423382.3 (14 Pages in Chinese, 16 Pages in English).

Taiwanese Office Action issued on May 28, 2021 in Counterpart of Taiwanese Patent Application No. 110101283 (16 pages in English and 15 pages in Taiwanese Mandarin Chinese ).

Taiwanese Office Action issued on Jun. 22, 2022, in the counterpart Taiwanese Patent Application No. 110142665 (10 Pages in English, 12 Pages in Mandarin).

Korean Office Action issued on Jan. 21, 2022, in counterpart Korean Patent Application No. 10-2020-0120733 (8 pages in English and 6 pages in Korean).

Taiwanese Office Action issued on Apr. 11, 2022, in counterpart Taiwanese Patent Application No. 110142665 (9 pages in English and 13 pages in Mandarin).

Chinese Office Action issued on Sep. 21, 2022, in counterpart Chinese Patent Application No. 202110448870.5 (14 pages in English and 16 pages in Chinese).

Taiwanese Office Action issued on Jun. 8, 2023, in counterpart Taiwanese Patent Application No. 111150545 (14 pages in English, 15 pages in Chinese).

Taiwanese Office Action issued on Dec. 25, 2023, in counterpart Taiwanese Patent Application No. 112145138 (11 pages in English, 12 pages in Chinese).

Korean Office Action issued on Dec. 20, 2023, in counterpart Korean Patent Application No. 10-2022-0133153 (6 pages in English, 5 pages in Korean).

Taiwanese Office Action issued on Jul. 31, 2024, in counterpart Taiwanese Patent Application No. 113123128 (11 pages in English, 9 pages in Chinese).

(56) References Cited

OTHER PUBLICATIONS

Taiwanese Office Action issued on Jan. 24, 2025, in corresponding Taiwanese Patent Application No. 114101110. (7pages in English, 7pages in Taiwanese).

Chinese Office Action Issued on May 21, 2025, in Counterpart Chinese Patent Application No. 202310227456.0 (5 Pages in English, 8 Pages in Chinese).

Taiwanese Office Action issued on Aug. 13, 2025, in counterpart Taiwanese Patent Application No. 114126088(9 pages in English, 8 pages in Taiwanese).

Chinese Office Action Issued on Dec. 11, 2025, in counterpart Chinese Patent Application No. 202310226101.X (6 Pages in English, 9 Pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2020-0120733 filed on Sep. 18, 2020, in the Korean Intellectual Property Office, the entire disclosure of which is incorporated herein by reference for all purposes.

BACKGROUND

1. Field

The present disclosure relates to an optical imaging system having a wide field of view of 100 degrees or more.

2. Description of the Background

A small-sized camera may be mounted on a wireless terminal device. For example, a small-sized camera may be mounted on each of a front surface and a rear surface of a wireless terminal device. As such a small-sized camera may be used for various purposes, to obtain images of scenery, indoor portraits, and the like, such a small-sized camera has been required to have a level of performance similar to that of a general camera. However, it may be difficult for a small-sized camera to implement high performance as there may be a limitation in mounting space, due to a limited size of a wireless terminal device. Thus, it has been necessary to develop an optical imaging system which may improve performance of a small-sized camera without increasing a size of the small-sized camera.

The above information is presented as background information only to assist in an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having refractive power, a second lens having refractive power and having a convex object-side surface, a third lens having refractive power and having a convex object-side surface, a fourth lens having refractive power, a fifth lens having refractive power, and a sixth lens having negative refractive power. The optical imaging system satisfies $100°≤FOV$, and $-2.0<\{IMGHT/(f*\tan(FOV/2))-1\}*100<2.0$, where FOV is a field of view of the optical imaging system, IMGHT is half of a diagonal length of an imaging plane, and f is a focal length of the optical imaging system.

The first lens may have a concave object-side surface or a concave image-side surface.

The fourth lens may have a concave object-side surface.

The fifth lens may have a convex object-side surface or a convex image-side surface.

The sixth lens may have a convex object-side surface.

The sixth lens may have a concave image-side surface.

The optical imaging system may satisfy $-1.5<f3/f4<-0.7$, where f3 is a focal length of the third lens, and f4 is a focal length of the fourth lens.

The optical imaging system may satisfy $0.6<|f4/f6|<1.8$, where f4 is a focal length of the fourth lens, and f6 is a focal length of the sixth lens.

The optical imaging system may satisfy $1.3<TTL/IMGHT<1.4$, where TTL is a distance from the object-side surface of the first lens to the imaging plane.

The optical imaging system may satisfy $1.8<f$ number$<2.3$.

In another general aspect, an optical imaging system includes a first lens having refractive power, a second lens having refractive power and having a convex object-side surface, a third lens having refractive power and having a convex object-side surface, a fourth lens having refractive power, a fifth lens having refractive power, a sixth lens having refractive power, wherein the first to sixth lenses are disposed in order from an object side, and wherein $100°≤FOV$, $-2.0<\{IMGHT/(f*\tan(FOV/2))-1\}*100<2.0$, and $TTL/IMGHT<1.4$.

The first lens may have refractive power having a sign different from a sign of the refractive power of the second lens.

The fourth lens may have refractive power having a sign different from a sign of the refractive power of the fifth lens.

The sixth lens may have negative refractive power.

The optical imaging system may satisfy $1.0<f1/f3<3.0$, where f1 is a focal length of the first lens.

The optical imaging system may satisfy $0.2<f3/f5<2.0$, where f5 is a focal length of the fifth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
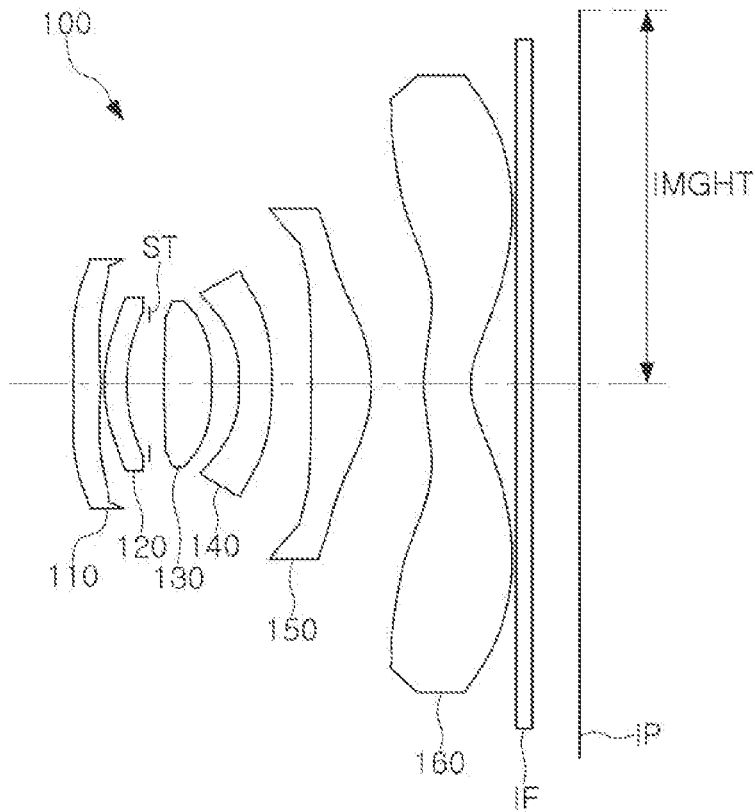
FIG. 1 is a diagram illustrating a first example of an optical imaging system.

The following detailed description is provided to assist the reader in gaining a comprehensive understanding of the methods, apparatuses, and/or systems described herein.

However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An aspect of the present disclosure is to provide an optical imaging system having a wide field of view.

In the examples, a first lens of an optical imaging system refers to a lens most adjacent to an object (or a subject), and a sixth lens refers to a lens most adjacent to an imaging plane (or an image sensor). An image sensor having an imaging surface may be disposed at the imaging plane of the optical imaging system. The image sensor converts an image of the object formed on an effective imaging area of the imaging surface by the lenses of the optical imaging system into an electrical signal. In the examples, units of a radius of curvature, a thickness, a TTL (a distance along the optical axis from the object-side surface of the first lens to the imaging plane), an IMGHT (a maximum effective image height of the optical imaging system and equal to one half of a diagonal length of the effective imaging area of the imaging surface of the image sensor or half of a diagonal length of an imaging plane), and a focal length are indicated in millimeters (mm). A thickness of a lens, a gap between lenses, and a TTL refer to a distance of a lens on an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

An optical imaging system according to the present disclosure may have a distortion characteristic of less than 2% while implementing a wide field of view. Therefore, the optical imaging system according to the present disclosure may reduce image quality deterioration caused by spherical aberration and distortion while capturing an image at a wide angle of view of 100 degrees (100°) or more. For example, the optical imaging system according to the present disclosure may reduce severe distortion at an edge of an image. Therefore, a camera module including an optical imaging system according to the present disclosure may omit or reduce a software operation for image correction.

An optical imaging system according to an example may include a first lens, a second lens, a third lens, a fourth lens, a fifth lens, and a sixth lens, disposed in order from an object side. In the optical imaging system, an object side of the second lens and an object side of the third lens may be convex. The sixth lens may have predetermined refractive power. For example, the sixth lens may have negative refractive power. The optical imaging system may have a wide field of view. For example, a field of view (FOV) of the optical imaging system may be 100 degrees or more. The optical imaging system may have a significant distortion aberration at a maximum height of the imaging plane. For example, the optical imaging system may have a distortion aberration greater than +2% or less than −2% at the maximum height of the imaging plane. The following conditional expression illustrates one form of constraint conditions for expressing FOV and distortion characteristics of the optical imaging system.

$$-2.0 < \{IMGHT/(f*\tan(FOV/2))-1\}*100 < 2.0$$

In the above conditional expression, FOV is a field of view of the optical imaging system, IMGHT is half of a diagonal length of the imaging plane, and f is a focal length of the optical imaging system.

An optical imaging system according to another example may include a first lens, a second lens, a third lens, a fourth lens, a fifth lens, and a sixth lens disposed in order from an object side. In the optical imaging system, an object side of the second lens and an object side of the third lens may be convex. The optical imaging system may have a wide field of view. For example, a field of view (FOV) of the optical imaging system may be 100 degrees or more. The optical imaging system may have a significant distortion aberration at a maximum height of an imaging plane. For example, the optical imaging system may have a distortion aberration greater than +2% or less than −2% at the maximum height of the imaging plane. The following conditional expressions illustrate another form of constraint conditions for expressing FOV and distortion characteristics of the optical imaging system.

$$-2.0 < \{IMGHT/(f*\tan(FOV/2))-1\}*100 < 2.0$$

$$TTL/IMGHT < 1.4$$

In the above conditional expressions, TTL is a distance (mm) from an object-side surface of the first lens to an imaging plane.

In the description below, a detailed configuration of an optical imaging system will be described.

The optical imaging system may include six lenses disposed in order from an object side in a direction of an imaging plane. For example, the optical imaging system may include a first lens, a second lens, a third lens, a fourth lens, a fifth lens, and a sixth lens disposed in order. The first to sixth lenses may be disposed at predetermined intervals. For example, a predetermined interval may be formed between an image-side surface of a front lens and an object-side surface of a rear lens.

The first lens may have refractive power. For example, the first lens may have positive refractive power or negative refractive power. One surface of the first lens may be concave. For example, the first lens may have a concave object-side surface or a concave image-side surface. The first lens may include an aspherical surface. For example, both surfaces of the first lens are aspherical. An inflection point may be formed on one surface of the first lens. For example, an inflection point may be formed on the object-side surface or the image-side surface of the first lens. However, the inflection point is not necessarily formed on one surface of the first lens. The first lens may be formed of a material having high light transmissivity and excellent workability. For example, the first lens may be manufactured using a plastic material. However, the material of the first lens is not limited to the plastic material. For example, the first lens may be manufactured using a glass material. The first lens has a predetermined refractive index. For example, the refractive index of the first lens may be greater than 1.5 to less than 1.6.

The second lens may have refractive power. For example, the second lens may have positive refractive power or negative refractive power. The second lens may have refractive power having a sign different from a sign of the refractive power of the first lens. For example, when the first lens has positive refractive power, the second lens may have negative refractive power. On the contrary, when the first lens has negative refractive power, the second lens may have positive refractive power. One surface of the second lens may be convex. For example, the second lens may have a convex object-side surface. The second lens may have an aspherical surface. For example, both surfaces of the second lens may be aspherical. The second lens may be formed of a material having high light transmissivity and excellent workability. For example, the second lens may be manufactured using a plastic material. However, the material of the second lens is not limited to the plastic material. For example, the second lens may be manufactured using a glass material. The second lens may have a predetermined refractive index. For example, the refractive index of the second lens may be greater than 1.5 to less than 1.7.

The third lens may have refractive power. For example, the third lens may have positive refractive power or negative refractive power. One surface of the third lens may be convex. For example, the third lens may have a convex object-side surface. The third lens may have an aspherical surface. For example, both surfaces of the third lens may be aspherical. The third lens may be formed of a material having high light transmissivity and excellent workability. For example, the third lens may be manufactured using a plastic material. However, the material of the third lens is not limited to the plastic material. For example, the third lens may be manufactured using a glass material. The third lens may have a predetermined refractive index. For example, the refractive index of the third lens may be greater than 1.5 to less than 1.7.

The fourth lens may have refractive power. For example, the fourth lens may have positive refractive power or negative refractive power. One surface of the fourth lens may be concave. For example, the fourth lens may have a concave object-side surface. The fourth lens may have an aspherical surface. For example, both surfaces of the fourth lens may be aspherical. The fourth lens may be manufactured using a material having high light transmissivity and excellent workability. For example, the fourth lens may be manufactured using a plastic material. However, the material of the fourth lens is not limited to a plastic material. For example, the fourth lens may be manufactured using a glass material. The fourth lens may have a predetermined refractive index. For example, the refractive index of the fourth lens may be greater than 1.5 to less than 1.7.

The fifth lens may have refractive power. For example, the fifth lens may have positive refractive power or negative refractive power. The fifth lens may have refractive power having a sign different from a sign of the refractive power of the fourth lens. For example, when the fourth lens has positive refractive power, the fifth lens may have negative refractive power. On the contrary, when the fourth lens has negative refractive power, the fifth lens may have positive refractive power. One surface of the fifth lens may be convex. For example, the fifth lens may have a convex object-side surface or a convex image-side surface. The fifth lens may have an aspherical surface. For example, both surfaces of the fifth lens may be aspherical. An inflection point may be formed on one surface of the fifth lens. For example, inflection points may be formed on an object-side surface and an image-side surface of the fifth lens. The fifth lens may be formed of a material having high light transmissivity and excellent workability. For example, the fifth lens may be manufactured using a plastic material. However, the material of the fifth lens is not limited to a plastic material. For example, the fifth lens may be manufactured using a glass material. The fifth lens may have a predetermined refractive index. For example, the refractive index of the fifth lens may be greater than 1.5 to less than 1.6.

The sixth lens may have refractive power. For example, the sixth lens may have negative refractive power. One surface of the sixth lens may be convex. For example, the sixth lens may have a convex object-side surface. The sixth lens may have an aspherical surface. For example, both surfaces of the sixth lens may be aspherical. An inflection point may be formed on one surface of the sixth lens. For example, inflection points may be formed on an object-side surface and an image-side surface of the sixth lens. The sixth lens may be formed of a material having high light transmissivity and excellent workability. For example, the sixth lens may be manufactured using a plastic material. However, the material of the sixth lens is not limited to the plastic material. For example, the sixth lens may be manufactured using a glass material. The sixth lens may have a predetermined refractive index. For example, the refractive index of the sixth lens may be greater than 1.5 and to less than 1.65.

Each of the first to sixth lenses may have an aspherical surface. For example, at least one surface of the first to sixth lenses may be aspherical. An aspherical surface of each of the first to sixth lenses may be represented by Equation 1 as below:

$$Z = \frac{cr^2}{1 + \sqrt{1 - (1 + k)c^2 r^2}} + Ar^4 + Br^6 + \qquad \text{(Equation 1)}$$
$$Cr^8 + Dr^{10} + Er^{12} + Fr^{14} + Gr^{16} + Hr^{18} + Jr^{20}$$

In Equation 1, "c" is an inverse of a radius of a curvature of a respective lens, "k" is a conic constant, "r" is a distance from a certain point on an aspherical surface of the lens to an optical axis, "A" to "H" and "J" are aspheric constants, "Z" (or SAG) is a height from a certain point on an aspherical surface to an apex of the aspherical surface in an optical axis direction.

The optical imaging system may further include a stop. The stop may be disposed between the first lens and the second lens or between the second lens and the third lens. The optical imaging system may further include a filter. The filter may be configured to block light of a certain wavelength from incident light incident through the first to sixth lenses. For example, the filter may block incident light of infrared wavelengths. The optical imaging system may further include an image sensor. The image sensor is configured to convert an optical signal into an electrical signal. The image sensor may provide a region (an imaging surface) in which light, refracted by lenses, may form an image of a subject. For example, a surface of the image sensor may form an imaging plane. The image sensor may include a charge-coupled device (CCD), or the like.

The optical imaging system may satisfy one or more of the following conditional expressions.

$$1.0 < f1/f3 < 3.0$$

$$-1.5 < f3/f4 < -0.7$$

$$0.6 < |f4/f6| < 1.8$$

8

$$0.2 < f3/f5 < 2.0$$

$$1.3 < TTL/\text{IMGHT} < 1.4$$

$$1.8 < f \text{ number} < 2.3$$

Herein and in the above conditional expressions, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, TTL is a distance from the object-side surface of the first lens to the imaging plane, and IMGHT is half of a diagonal length of the imaging plane.

In the description below, various examples of an optical imaging system will be described.

Hereinafter, an optical imaging system according to a first example will be described with reference to FIG. 1.

The optical imaging system 100 may include lenses, each having refractive power. For example, the optical imaging system 100 may include a first lens 110, a second lens 120, a third lens 130, a fourth lens 140, a fifth lens 150, and a sixth lens 160.

The first lens 110 may have positive refractive power, and may have a concave object-side surface and a convex image-side surface. The second lens 120 may have negative refractive power, and may have a convex object-side surface and a concave image-side surface. The third lens 130 may have positive refractive power, and may have a convex object-side surface and a convex image-side surface. The fourth lens 140 may have negative refractive power, and may have a concave object-side surface and a convex image-side surface. The fifth lens 150 may have positive refractive power, and may have a convex object-side surface and a convex image-side surface. The fifth lens 150 may have a shape having an inflection point. For example, inflection points may be formed on the object-side surface and the image-side surface of the fifth lens 150. The sixth lens 160 may have negative refractive power, and may have a convex object-side surface and a concave image-side surface. The sixth lens 160 may have a shape having an inflection point. For example, inflection points may be formed on the object-side surface and the image-side surface of the sixth lens 160.

The optical imaging system 100 may include a stop ST. For example, the stop ST may be disposed between the second lens 120 and the third lens 130. The optical imaging system 100 may include a filter IF. For example, the filter IF may be disposed between the sixth lens 160 and an imaging plane IP. The filter IF may block light of specific wavelengths from being incident. For example, the filter IF according to the first example may block infrared light from being incident to the imaging plane IP.

Figure 2:
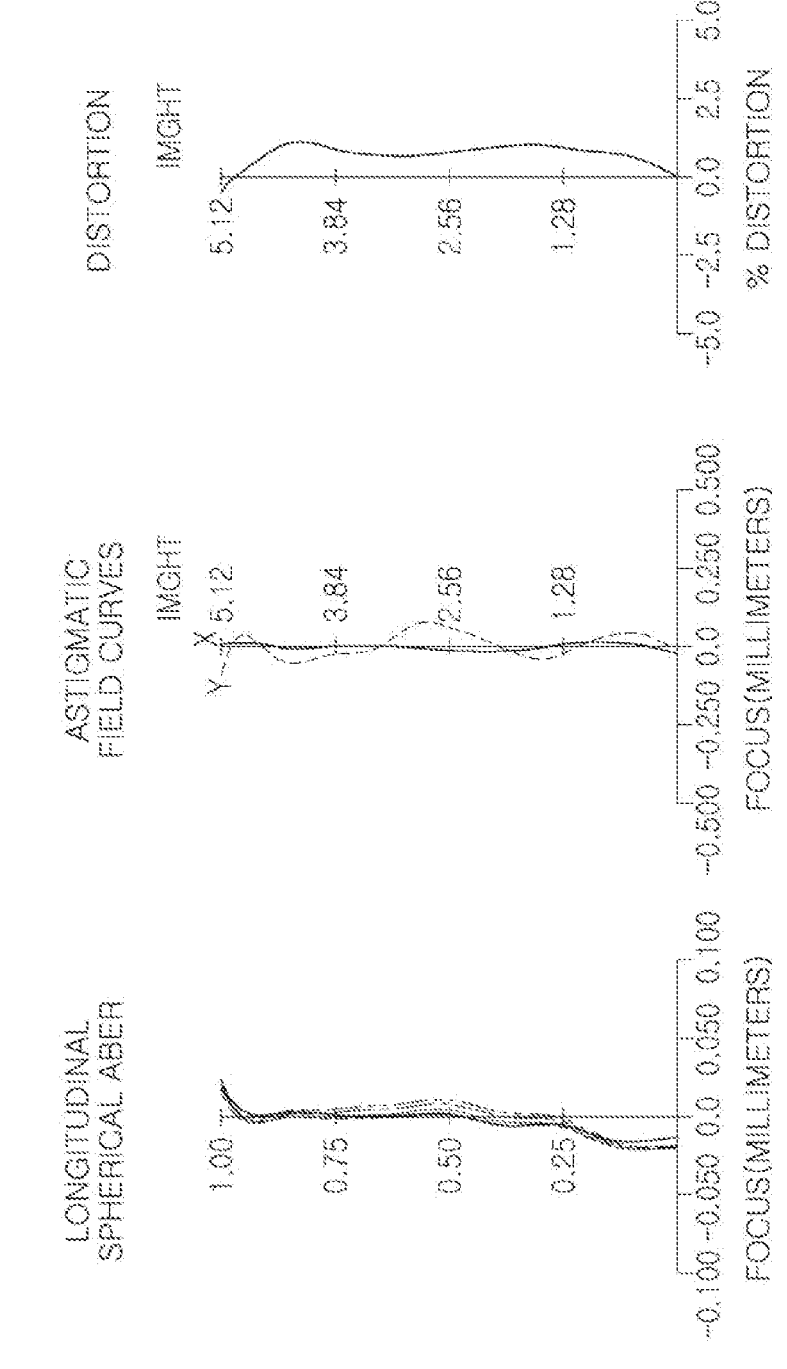
FIG. 2 presents aberration curves of the optical imaging system illustrated in FIG. 1.

The optical imaging system 100 exhibits aberration characteristics as illustrated in FIG. 2. Lens characteristics of the optical imaging system 100 are listed in Table 1, and aspherical characteristics of the optical imaging system 100 are listed in Table 2.

TABLE 1

| Surface No. | Note | Radius of Curvature | Thickness/ Distance | Refractive Index | Abbe Number | Effective Radius |
|---|---|---|---|---|---|---|
| S1 | First Lens | −10.2396 | 0.3753 | 1.5460 | 56.2410 | 1.7719 |
| S2 | | −4.4483 | 0.0500 | | | 1.5987 |
| S3 | Second Lens | 2.2768 | 0.3054 | 1.6190 | 25.9402 | 1.2273 |

TABLE 1-continued

| Surface No. | Note | Radius of Curvature | Thickness/ Distance | Refractive Index | Abbe Number | Effec- tive Radius |
|---|---|---|---|---|---|---|
| S4 | | 1.9091 | 0.3104 | | | 1.0085 |
| S5 | Stop | infinity | 0.2049 | | | 0.9000 |
| S6 | Third Lens | 11.4563 | 0.6556 | 1.5460 | 56.2410 | 1.0614 |
| S7 | | −3.2842 | 0.3742 | | | 1.1800 |
| S8 | Fourth Lens | −2.6030 | 0.4500 | 1.6773 | 19.2373 | 1.2846 |
| S9 | | −6.8792 | 0.5317 | | | 1.6101 |
| S10 | Fifth Lens | 132.9675 | 0.8344 | 1.5460 | 56.2410 | 2.1800 |
| S11 | | −2.2669 | 0.7245 | | | 2.4894 |
| S12 | Sixth Lens | 2.0456 | 0.6400 | 1.5369 | 55.6518 | 3.7650 |
| S13 | | 1.0556 | 0.6276 | | | 4.3764 |
| S14 | Filter | infinity | 0.2100 | 1.5183 | 64.1973 | 4.8031 |
| S15 | | infinity | 0.6362 | | | 4.8787 |
| S16 | Imaging Plane | infinity | 0.0200 | | | 5.1200 |

TABLE 2

| Surface No. | S1 | S2 | S3 | S4 | S6 | S7 |
|---|---|---|---|---|---|---|
| K | −2.499.E+01 | −5.610.E+01 | −4.792.E+00 | −2.878.E+00 | 1.498.E+01 | 5.945.E+00 |
| 4th | 9.832.E−02 | 2.811.E−01 | 2.174.E−01 | −1.456.E−01 | −6.067.E−02 | 4.130.E−02 |
| 6th | −6.866.E−02 | −8.944.E−01 | −1.089.E+00 | 2.031.E+00 | 9.494.E−01 | −1.421.E+00 |
| 8th | 4.654.E−02 | 2.631.E+00 | 4.861.E+00 | −2.563.E+01 | −1.133.E+01 | 1.305.E+01 |
| 10th | 5.972.E−02 | −5.986.E+00 | −1.877.E+01 | 2.147.E+02 | 8.332.E+01 | −7.529.E+01 |
| 12th | −3.018.E−01 | 1.029.E+01 | 5.765.E+01 | −1.220.E+03 | −4.077.E+02 | 2.910.E+02 |
| 14th | 5.784.E−01 | −1.325.E+01 | −1.348.E+02 | 4.854.E+03 | 1.385.E+03 | −7.845.E+02 |
| 16th | −6.804.E−01 | 1.275.E+01 | 2.356.E+02 | −1.384.E+04 | −3.353.E+03 | 1.512.E+03 |
| 18th | 5.388.E−01 | −9.116.E+00 | −3.048.E+02 | 2.858.E+04 | 5.859.E+03 | −2.111.E+03 |
| 20th | −2.961.E−01 | 4.801.E+00 | 2.895.E+02 | −4.278.E+04 | −7.404.E+03 | 2.138.E+03 |
| 22nd | 1.134.E−01 | −1.830.E+00 | −1.988.E+02 | 4.593.E+04 | 6.699.E+03 | −1.554.E+03 |
| 24th | −2.971.E−02 | 4.894.E−01 | 9.591.E+01 | −3.445.E+04 | −4.228.E+03 | 7.901.E+02 |
| 26th | 5.081.E−03 | −8.692.E−02 | −3.081.E+01 | 1.712.E+04 | 1.767.E+03 | −2.666.E+02 |
| 28th | −5.113.E−04 | 9.188.E−03 | 5.914.E+00 | −5.068.E+03 | −4.392.E+02 | 5.358.E+01 |
| 30th | 2.296.E−05 | −4.366.E−04 | −5.131.E−01 | 6.756.E+02 | 4.914.E+01 | −4.853.E+00 |

| Surface No. | S8 | S9 | S10 | S11 | S12 | S13 |
|---|---|---|---|---|---|---|
| K | 4.1728.E−01 | −5.2170.E+01 | −9.9000.E+01 | −2.2230.E+00 | −1.6821.E+01 | −4.1905.E+00 |
| 4th | −1.2526.E−01 | −1.0374.E−01 | −3.9596.E−02 | −6.2950.E−02 | −7.2814.E−02 | −4.1414.E−02 |
| 6th | 2.5403.E−02 | 3.0336.E−02 | 1.3069.E−01 | 1.3651.E−01 | 1.3846.E−02 | 1.1426.E−02 |
| 8th | −3.7442.E−02 | −1.4304.E−02 | −2.7209.E−01 | −1.7050.E−01 | 3.1226.E−03 | −2.3057.E−03 |
| 10th | 6.8485.E−02 | 1.1445.E−02 | 3.4143.E−01 | 1.4245.E−01 | −3.7139.E−03 | 3.5016.E−04 |
| 12th | −3.9811.E−02 | −4.4408.E−03 | −2.7678.E−01 | −7.8748.E−02 | 1.6591.E−03 | −5.2052.E−05 |
| 14th | 8.6156.E−03 | 6.5468.E−04 | 1.4654.E−01 | 2.7723.E−02 | −4.7048.E−04 | 9.8103.E−06 |
| 16th | 0 | 0 | −4.8202.E−02 | −5.2526.E−03 | 9.2608.E−05 | −1.8253.E−06 |
| 18th | 0 | 0 | 7.6255.E−03 | −2.5270.E−05 | −1.3025.E−05 | 2.5572.E−07 |
| 20th | 0 | 0 | 7.8870.E−04 | 3.0053.E−04 | 1.3172.E−06 | −2.5068.E−08 |
| 22nd | 0 | 0 | −7.1261.E−04 | −8.5342.E−05 | −9.4949.E−08 | 1.6968.E−09 |
| 24th | 0 | 0 | 1.7242.E−04 | 1.2787.E−05 | 4.7572.E−09 | −7.8009.E−11 |
| 26th | 0 | 0 | −2.2190.E−05 | −1.1352.E−06 | −1.5736.E−10 | 2.3328.E−12 |
| 28th | 0 | 0 | 1.5318.E−06 | 5.6651.E−08 | 3.0895.E−12 | −4.1013.E−14 |
| 30th | 0 | 0 | −4.4712.E−08 | −1.2329.E−09 | −2.7268.E−14 | 3.2202.E−16 |

Figure 3:
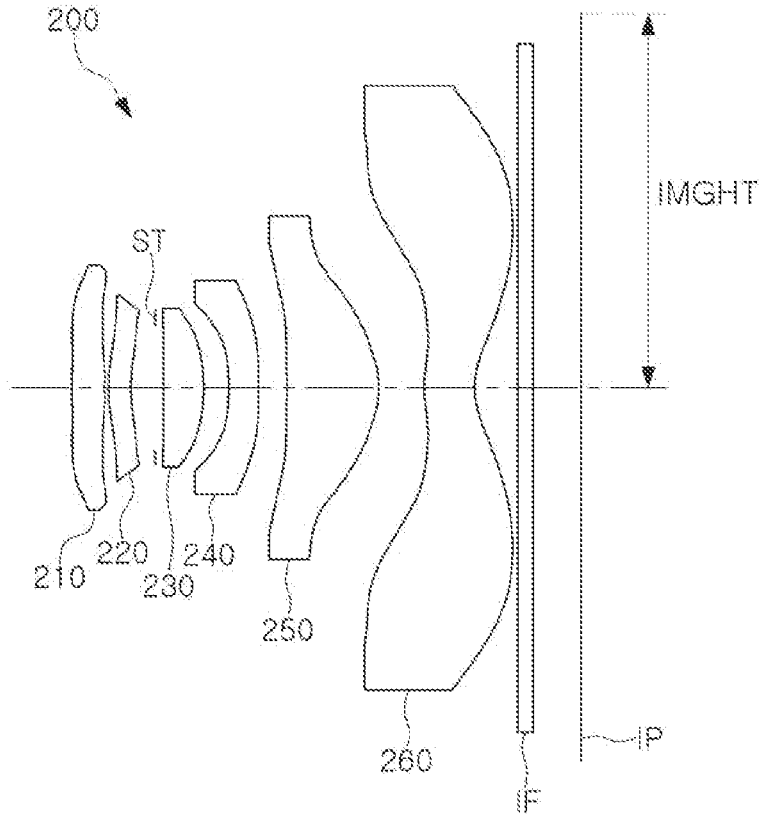
FIG. 3 is a diagram illustrating a second example of an optical imaging system.

Hereinafter, an optical imaging system according to a second example will be described with reference to FIG. 3.

The optical imaging system 200 may include lenses, each having refractive power. For example, the optical imaging system 200 may include a first lens 210, a second lens 220, a third lens 230, a fourth lens 240, a fifth lens 250, and a sixth lens 260.

The first lens 210 may have positive refractive power, and may have a concave object-side surface and a convex image-side surface. The second lens 220 may have negative refractive power, and may have a convex object-side surface and a concave image-side surface. The third lens 230 may have positive refractive power and may have a convex object-side surface and a convex image-side surface. The fourth lens 240 may have negative refractive power, and may have a concave object-side surface and a concave image-side surface. The fifth lens 250 may have positive refractive power, and may have a concave object-side surface and a convex image-side surface. The fifth lens 250 may have a shape having an inflection point. For example, inflection points may be formed on the object-side surface and the image-side surface of the fifth lens 250. The sixth lens 260 may have negative refractive power, and may have a convex object-side surface and a concave image-side surface. The sixth lens 260 may have a shape having an inflection point. For example, inflection points may be formed on the object-side surface and the image-side surface of the sixth lens 260.

The optical imaging system 200 may include a stop ST. For example, the stop ST may be disposed between the second lens 220 and the third lens 230. The optical imaging system 200 may include a filter IF. For example, the filter IF may be disposed between the sixth lens 260 and an imaging plane IP. The filter IF may block light of specific wavelengths from being incident. For example, the filter IF according to the second example may block infrared light from being incident to the imaging plane IP.

Figure 4:
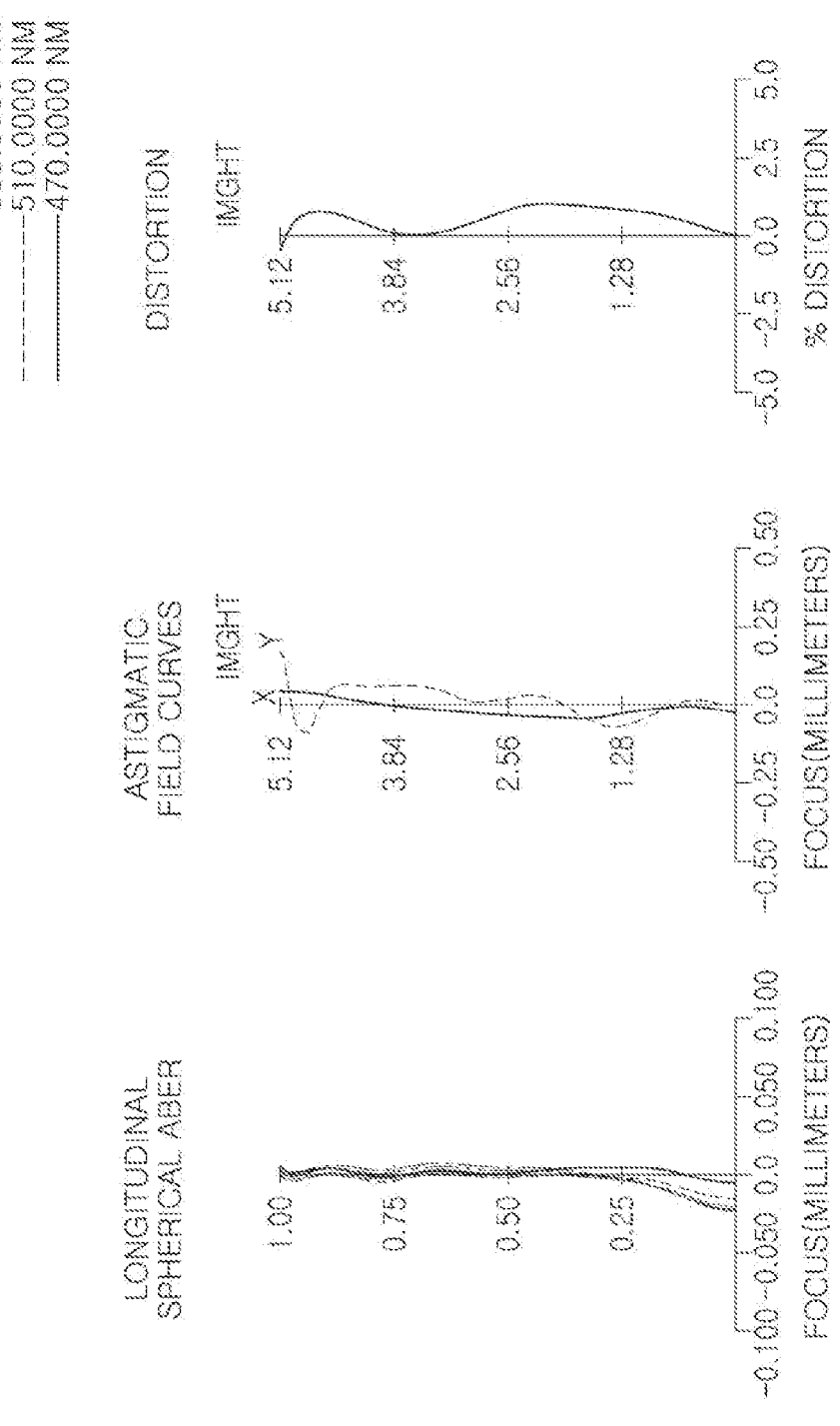
FIG. 4 presents aberration curves of the optical imaging system illustrated in FIG. 3.

The optical imaging system 200 exhibits aberration characteristics as illustrated in FIG. 4. Lens characteristics of the optical imaging system 200 are listed in Table 3, and aspherical characteristics of the optical imaging system 200 are listed in Table 4.

11

TABLE 3

| Surface No. | Note | Radius of Curvature | Thickness/ Distance | Refractive Index | Abbe Number | Effective Radius |
|---|---|---|---|---|---|---|
| S1 | First Lens | −16.1331 | 0.4478 | 1.5459 | 56.0948 | 1.7802 |
| S2 |  | −3.7193 | 0.0604 |  |  | 1.6213 |
| S3 | Second Lens | 3.9259 | 0.3000 | 1.6440 | 23.5076 | 1.3324 |
| S4 |  | 2.9386 | 0.3357 |  |  | 1.1044 |
| S5 | Stop | infinity | 0.1025 |  |  | 0.9100 |
| S6 | Third Lens | 23.6511 | 0.5523 | 1.5459 | 56.0948 | 1.0067 |
| S7 |  | −3.5737 | 0.3456 |  |  | 1.1318 |
| S8 | Fourth Lens | −4.3524 | 0.4200 | 1.6769 | 19.2306 | 1.2084 |
| S9 |  | 2000.0000 | 0.3786 |  |  | 1.5299 |
| S10 | Fifth Lens | −59.7521 | 1.2590 | 1.5366 | 55.7103 | 2.0600 |
| S11 |  | −1.7906 | 0.6266 |  |  | 2.4470 |
| S12 | Sixth Lens | 2.9373 | 0.6939 | 1.5366 | 55.7103 | 3.6300 |
| S13 |  | 1.1111 | 0.5816 |  |  | 4.2913 |
| S14 | Filter | infinity | 0.2100 | 1.5183 | 64.1973 | 4.7950 |
| S15 |  | infinity | 0.6163 |  |  | 4.8698 |
| S16 | Imaging Plane | infinity | 0.0200 |  |  | 5.1200 |

TABLE 4

| Surface No. | S1 | S2 | S3 | S4 | S6 | S7 |
|---|---|---|---|---|---|---|
| K | −9.735.E+01 | −3.095.E+01 | −1.583.E+01 | −8.952.E+00 | 6.624.E+01 | 6.621.E+00 |
| 4th | 6.022.E−02 | 2.318.E−01 | 2.121.E−01 | −1.089.E−01 | −1.003.E−01 | −1.287.E−02 |
| 6th | −1.073.E−01 | −7.448.E−01 | −1.338.E+00 | 9.016.E−01 | 1.709.E+00 | −1.148.E+00 |
| 8th | 3.871.E−01 | 2.169.E+00 | 6.668.E+00 | −1.029.E+01 | −2.080.E+01 | 1.342.E+01 |
| 10th | −9.714.E−01 | −4.885.E+00 | −2.629.E+01 | 7.357.E+01 | 1.569.E+02 | −9.532.E+01 |
| 12th | 1.653.E+00 | 8.350.E+00 | 7.595.E+01 | −3.504.E+02 | −7.894.E+02 | 4.493.E+02 |
| 14th | −1.964.E+00 | −1.076.E+01 | −1.592.E+02 | 1.164.E+03 | 2.768.E+03 | −1.471.E+03 |
| 16th | 1.669.E+00 | 1.042.E+01 | 2.427.E+02 | −2.771.E+03 | −6.939.E+03 | 3.431.E+03 |
| 18th | −1.028.E+00 | −7.531.E+00 | −2.701.E+02 | 4.790.E+03 | 1.258.E+04 | −5.785.E+03 |
| 20th | 4.595.E−01 | 4.025.E+00 | 2.187.E+02 | −6.023.E+03 | −1.653.E+04 | 7.062.E+03 |
| 22nd | −1.478.E−01 | −1.563.E+00 | −1.272.E+02 | 5.452.E+03 | 1.554.E+04 | −6.181.E+03 |
| 24th | 3.333.E−02 | 4.278.E−01 | 5.169.E+01 | −3.460.E+03 | −1.018.E+04 | 3.779.E+03 |
| 26th | −5.004.E−03 | −7.809.E−02 | −1.393.E+01 | 1.460.E+03 | 4.396.E+03 | −1.532.E+03 |
| 28th | 4.494.E−04 | 8.525.E−03 | 2.235.E+00 | −3.679.E+02 | −1.122.E+03 | 3.699.E+02 |
| 30th | −1.827.E−05 | −4.208.E−04 | −1.616.E−01 | 4.188.E+01 | 1.277.E+02 | −4.026.E+01 |

| Surface No. | S8 | S9 | S10 | S11 | S12 | S13 |
|---|---|---|---|---|---|---|
| K | 6.8441.E+00 | 0.0000.E+00 | −9.6397.E+01 | −1.3902.E+00 | −3.0871.E+01 | −3.8948.E+00 |
| 4th | −2.6771.E−01 | −1.4929.E−01 | −3.7976.E−02 | −3.3006.E−02 | −9.9112.E−02 | −6.9275.E−02 |
| 6th | 9.7244.E−01 | −1.5532.E−02 | 4.9147.E−02 | 4.9625.E−02 | 1.1029.E−02 | 3.2178.E−02 |
| 8th | −6.5187.E+00 | 7.3596.E−01 | −1.4616.E−01 | −4.6451.E−02 | 3.0253.E−02 | −9.9349.E−03 |
| 10th | 2.8769.E+01 | −3.3048.E+00 | 2.9712.E−01 | 2.2723.E−02 | −2.9993.E−02 | 1.7021.E−03 |
| 12th | −8.0200.E+01 | 8.9188.E+00 | −4.1096.E−01 | 2.5066.E−03 | 1.5276.E−02 | −3.0121.E−05 |
| 14th | 1.3648.E+02 | −1.6272.E+01 | 3.9819.E−01 | −1.2544.E−02 | −5.0119.E−03 | −6.3322.E−05 |
| 16th | −1.1367.E+02 | 2.0965.E+01 | −2.7449.E−01 | 9.6184.E−03 | 1.1369.E−03 | 1.7741.E−05 |
| 18th | −4.6055.E+01 | −1.9443.E+01 | 1.3628.E−01 | −4.1341.E−03 | −1.8370.E−04 | −2.7077.E−06 |
| 20th | 2.5169.E+02 | 1.3035.E+01 | −4.8953.E−02 | 1.1444.E−03 | 2.1341.E−05 | 2.7069.E−07 |
| 22nd | −3.3157.E+02 | −6.2633.E+00 | 1.2626.E−02 | −2.1176.E−04 | −1.7716.E−06 | −1.8466.E−08 |
| 24th | 2.4448.E+02 | 2.1033.E+00 | −2.2814.E−03 | 2.6090.E−05 | 1.0262.E−07 | 8.5477.E−10 |
| 26th | −1.0842.E+02 | −4.6880.E−01 | 2.7421.E−04 | −2.0543.E−06 | −3.9414.E−09 | −2.5733.E−11 |
| 28th | 2.7121.E+01 | 6.2316.E−02 | −1.9682.E−05 | 9.3357.E−08 | 9.0239.E−11 | 4.5491.E−13 |
| 30th | −2.9542.E+00 | −3.7388.E−03 | 6.3777.E−07 | −1.8558.E−09 | −9.3231.E−13 | −3.5846.E−15 |

Figure 5:
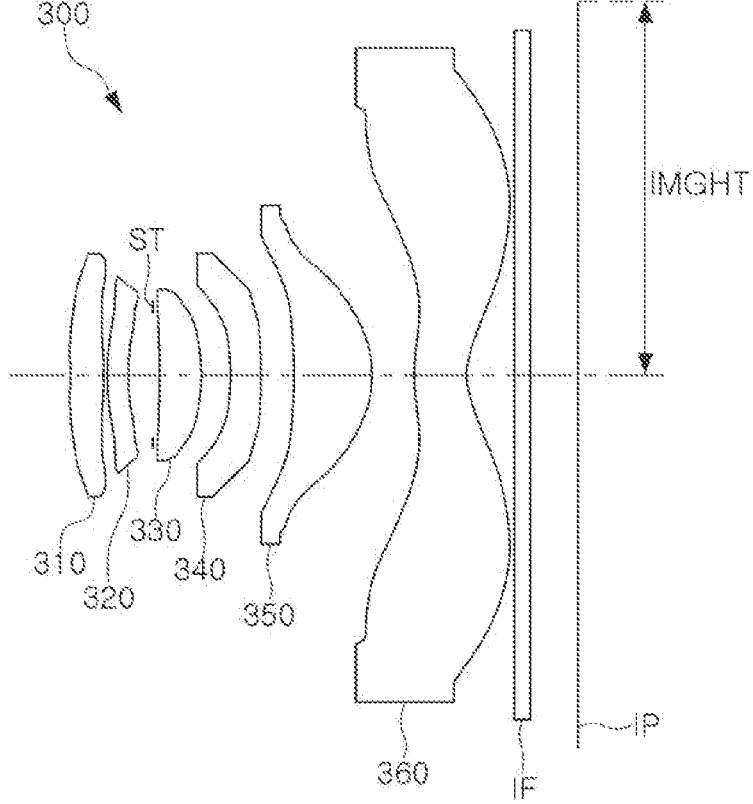
FIG. 5 is a diagram illustrating a third example of an optical imaging system.

Hereinafter, an optical imaging system according to a third example will be described with reference to FIG. 5.

The optical imaging system 300 may include lenses, each having refractive power. For example, the optical imaging system 300 includes a first lens 310, a second lens 320, a third lens 330, a fourth lens 340, a fifth lens 350, and a sixth lens 360.

The first lens 310 may have positive refractive power, and may have a concave object-side surface and a convex image-side surface. The second lens 320 may have negative refractive power, and may have a convex object-side surface and a concave image-side surface. The third lens 330 may have positive refractive power and may have a convex object-side surface and a convex image-side surface. The fourth lens 340 may have negative refractive power and may have a concave object-side surface and a concave image-side surface. The fifth lens 350 may have positive refractive power, and may have a concave object-side surface and a convex image-side surface. The fifth lens 350 may have a shape having an inflection point. For example, inflection points may be formed on the object-side surface and the image-side surface of the fifth lens 350. The sixth lens 360 may have negative refractive power, and may have a convex object-side surface and a concave image-side surface. The sixth lens 360 may have a shape having an inflection point. For example, inflection points may be formed on the object-side surface and the image-side surface of the sixth lens 360.

The optical imaging system 300 may include a stop ST. For example, the stop ST may be disposed between the second lens 320 and the third lens 330. The optical imaging system 300 may include a filter IF. For example, the filter IF may be disposed between the sixth lens 360 and an imaging plane IP. The filter IF may block light of specific wavelengths from being incident. For example, the filter IF according to the third example may block infrared light from being incident to the imaging plane IP.

Figure 6:
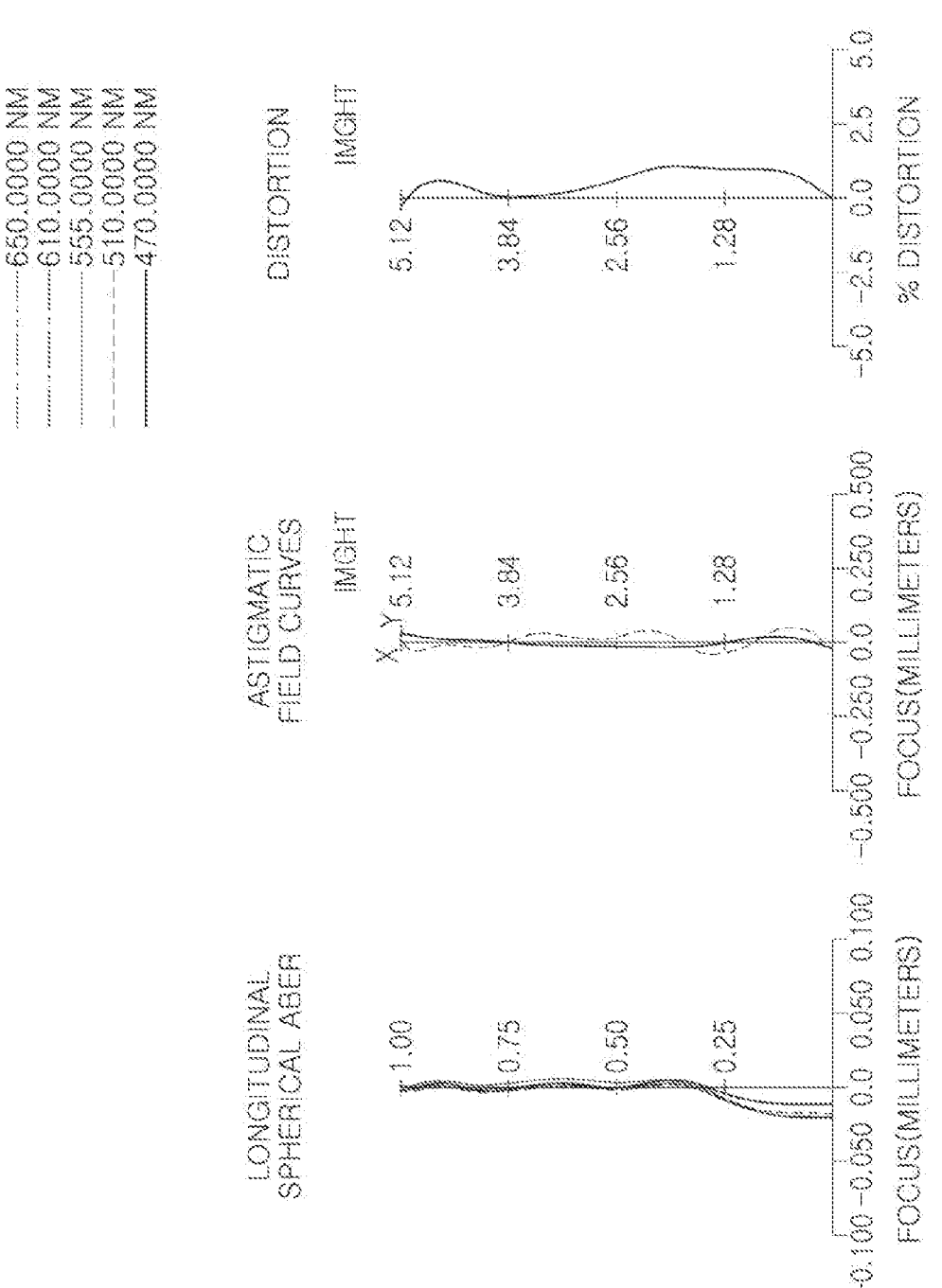
FIG. 6 presents aberration curves of the optical imaging system illustrated in FIG. 5.

The optical imaging system 300 exhibits aberration characteristics as illustrated in FIG. 6. Lens characteristics of the optical imaging system 300 are listed in Table 5, and aspherical characteristics of the optical imaging system 300 are listed in Table 6.

TABLE 5

| Surface No. | Note | Radius of Curvature | Thickness/ Distance | Refractive Index | Abbe Number | Effective Radius |
|---|---|---|---|---|---|---|
| S1 | First Lens | −143.7315 | 0.4454 | 1.5459 | 56.0948 | 1.7217 |
| S2 | | −4.7085 | 0.0500 | | | 1.5667 |
| S3 | Second Lens | 4.1326 | 0.3000 | 1.6440 | 23.5076 | 1.3240 |
| S4 | | 3.0576 | 0.3293 | | | 1.0987 |
| S5 | Stop | infinity | 0.0829 | | | 0.9100 |
| S6 | Third Lens | 51.8872 | 0.5788 | 1.5366 | 55.7103 | 0.9770 |
| S7 | | −3.5038 | 0.3968 | | | 1.1429 |
| S8 | Fourth Lens | −5.0165 | 0.4200 | 1.6769 | 19.2306 | 1.2770 |
| S9 | | 83.3767 | 0.4496 | | | 1.6203 |
| S10 | Fifth Lens | −11.9515 | 1.0700 | 1.5366 | 55.7103 | 1.9689 |
| S11 | | −1.6277 | 0.5938 | | | 2.2500 |
| S12 | Sixth Lens | 2.8210 | 0.7211 | 1.5366 | 55.7103 | 3.8193 |
| S13 | | 1.1273 | 0.6259 | | | 4.3382 |
| S14 | Filter | infinity | 0.2100 | 1.5183 | 64.1973 | 4.8067 |
| S15 | | infinity | 0.6567 | | | 4.8798 |
| S16 | Imaging Plane | infinity | 0.0200 | | | 5.1200 |

TABLE 6

| Surface No. | S1 | S2 | S3 | S4 | S6 | S7 |
|---|---|---|---|---|---|---|
| K | −9.900.E+01 | −2.704.E+01 | −1.635.E+01 | −7.782.E+00 | 9.069.E+01 | 6.399.E+00 |
| 4th | 4.338.E-02 | 2.202.E-01 | 1.495.E-01 | −8.482.E-02 | −4.272.E-02 | −6.039.E-02 |
| 6th | −4.152.E-02 | −6.588.E-01 | −9.020.E-01 | 3.099.E-01 | 4.193.E-01 | −3.680.E-02 |
| 8th | 1.639.E-01 | 1.927.E+00 | 4.186.E+00 | −3.352.E+00 | −6.912.E+00 | 1.087.E+00 |
| 10th | −4.729.E-01 | −4.452.E+00 | −1.578.E+01 | 2.421.E+01 | 6.723.E+01 | −1.015.E+01 |
| 12th | 9.264.E-01 | 7.765.E+00 | 4.444.E+01 | −1.161.E+02 | −4.249.E+02 | 5.548.E+01 |
| 14th | −1.270.E+00 | −1.011.E+01 | −9.192.E+01 | 3.875.E+02 | 1.835.E+03 | −1.983.E+02 |
| 16th | 1.247.E+00 | 9.796.E+00 | 1.396.E+02 | −9.282.E+02 | −5.579.E+03 | 4.880.E+02 |
| 18th | −8.882.E-01 | −7.051.E+00 | −1.556.E+02 | 1.621.E+03 | 1.214.E+04 | −8.473.E+02 |
| 20th | 4.596.E-01 | 3.742.E+00 | 1.267.E+02 | −2.068.E+03 | −1.897.E+04 | 1.047.E+03 |
| 22nd | −1.708.E-01 | −1.442.E+00 | −7.428.E+01 | 1.908.E+03 | 2.111.E+04 | −9.153.E+02 |
| 24th | 4.443.E-02 | 3.916.E-01 | 3.048.E+01 | −1.239.E+03 | −1.631.E+04 | 5.534.E+02 |
| 26th | −7.670.E-03 | −7.108.E-02 | −8.300.E+00 | 5.366.E+02 | 8.311.E+03 | −2.202.E+02 |
| 28th | 7.892.E-04 | 7.732.E-03 | 1.346.E+00 | −1.391.E+02 | −2.510.E+03 | 5.185.E+01 |
| 30th | −3.662.E-05 | −3.811.E-04 | −9.825.E-02 | 1.631.E+01 | 3.401.E+02 | −5.480.E+00 |

| Surface No. | S8 | S9 | S10 | S11 | S12 | S13 |
|---|---|---|---|---|---|---|
| K | 2.5315.E+00 | −8.3994.E+00 | 3.5316.E+01 | −1.1411.E+00 | −2.6644.E+01 | −3.4149.E+00 |
| 4th | −2.1113.E-01 | −9.1572.E-02 | 2.6473.E-04 | 6.5968.E-03 | −4.6938.E-02 | −6.3480.E-02 |
| 6th | 7.0295.E-01 | −1.7205.E-01 | −2.9070.E-02 | −9.1384.E-02 | −4.0735.E-02 | 2.2220.E-02 |
| 8th | −5.5194.E+00 | 9.4994.E-01 | −3.6259.E-02 | 3.2411.E-01 | 5.9983.E-02 | −3.3105.E-03 |
| 10th | 2.7490.E+01 | −2.8564.E+00 | 1.9398.E-01 | −6.6035.E-01 | −4.0062.E-02 | −9.1946.E-04 |
| 12th | −8.9797.E+01 | 5.8614.E+00 | −3.8099.E-01 | 8.5908.E-01 | 1.6981.E-02 | 6.4874.E-04 |
| 14th | 2.0227.E+02 | −8.5364.E+00 | 4.5855.E-01 | −7.6038.E-01 | −4.9165.E-03 | −1.8203.E-04 |
| 16th | −3.2342.E+02 | 9.0107.E+00 | −3.7637.E-01 | 4.7322.E-01 | 1.0054.E-03 | 3.1823.E-05 |
| 18th | 3.7239.E+02 | −6.9611.E+00 | 2.1996.E-01 | −2.1053.E-01 | −1.4772.E-04 | −3.8085.E-06 |
| 20th | −3.0937.E+02 | 3.9349.E+00 | −9.2752.E-02 | 6.7222.E-02 | 1.5668.E-05 | 3.2131.E-07 |
| 22nd | 1.8338.E+02 | −1.6093.E+00 | 2.8034.E-02 | −1.5265.E-02 | −1.1899.E-06 | −1.9135.E-08 |
| 24th | −7.5426.E+01 | 4.6367.E-01 | −5.9204.E-03 | 2.4035.E-03 | 6.3149.E-08 | 7.8815.E-10 |
| 26th | 2.0379.E+01 | −8.9299.E-02 | 8.2884.E-04 | −2.4916.E-04 | −2.2248.E-09 | −2.1372.E-11 |
| 28th | −3.2364.E+00 | 1.0322.E-02 | −6.9065.E-05 | 1.5285.E-05 | 4.6770.E-11 | 3.4330.E-13 |
| 30th | 2.2738.E-01 | −5.4176.E-04 | 2.5919.E-06 | −4.2023.E-07 | −4.4411.E-13 | −2.4746.E-15 |

Figure 7:
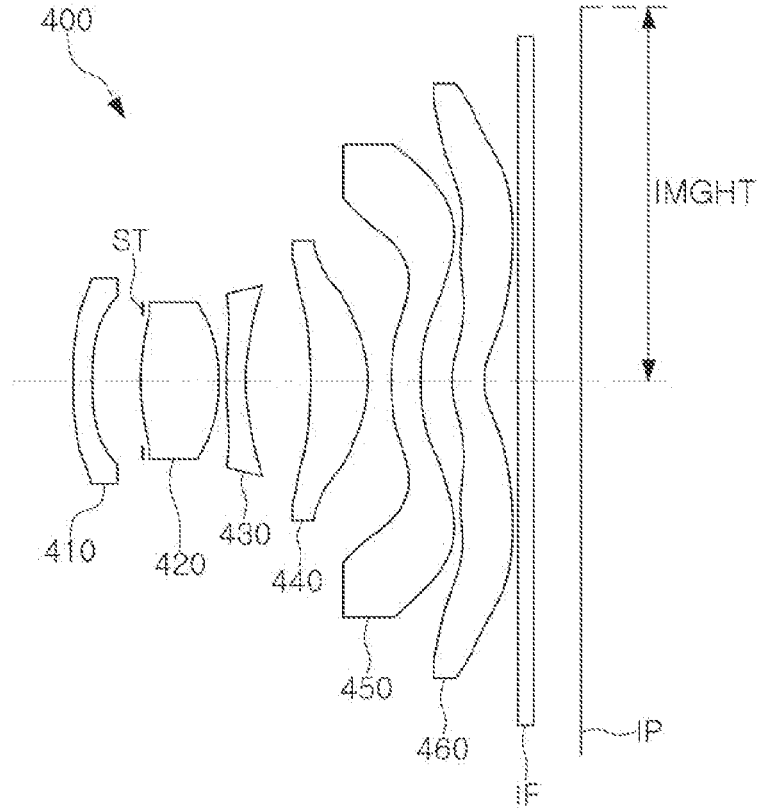
FIG. 7 is a diagram illustrating a fourth example of an optical imaging system.

An optical imaging system according to a fourth example will be described with reference to FIG. 7.

The optical imaging system 400 may include lenses, each having refractive power. For example, the optical imaging system 400 includes a first lens 410, a second lens 420, a third lens 430, a fourth lens 440, a fifth lens 450, and a sixth lens 460.

The first lens 410 may have negative refractive power, and may have a convex object-side surface and a concave image-side surface. The second lens 420 may have positive refractive power and may have a convex object-side surface and a convex image-side surface. The third lens 430 may have negative refractive power, and may have a convex object-side surface and a concave image-side surface. The fourth lens 440 may have positive refractive power, and may have a concave object-side surface and a convex image-side surface. The fifth lens 450 may have negative refractive power, and may have a convex object-side surface and a concave image-side surface. The fifth lens 450 may have a shape having an inflection point. For example, inflection points may be formed on the object-side surface and the image-side surface of the fifth lens 450. The sixth lens 460 may have negative refractive power, and may have a convex object-side surface and a concave image-side surface. The sixth lens 460 may have a shape having an inflection point. For example, inflection points may be formed on the object-side surface and the image-side surface of the sixth lens 460.

The optical imaging system 400 may include a stop ST. For example, the stop ST may be disposed between the first lens 410 and the second lens 420. The optical imaging system 400 may include a filter IF. For example, the filter IF may be disposed between the sixth lens 460 and an imaging plane IP. The filter IF may block light of specific wave lengths from being incident. For example, the filter IF according to the fourth example may block infrared light from being incident to the imaging plane IP.

Figure 8:
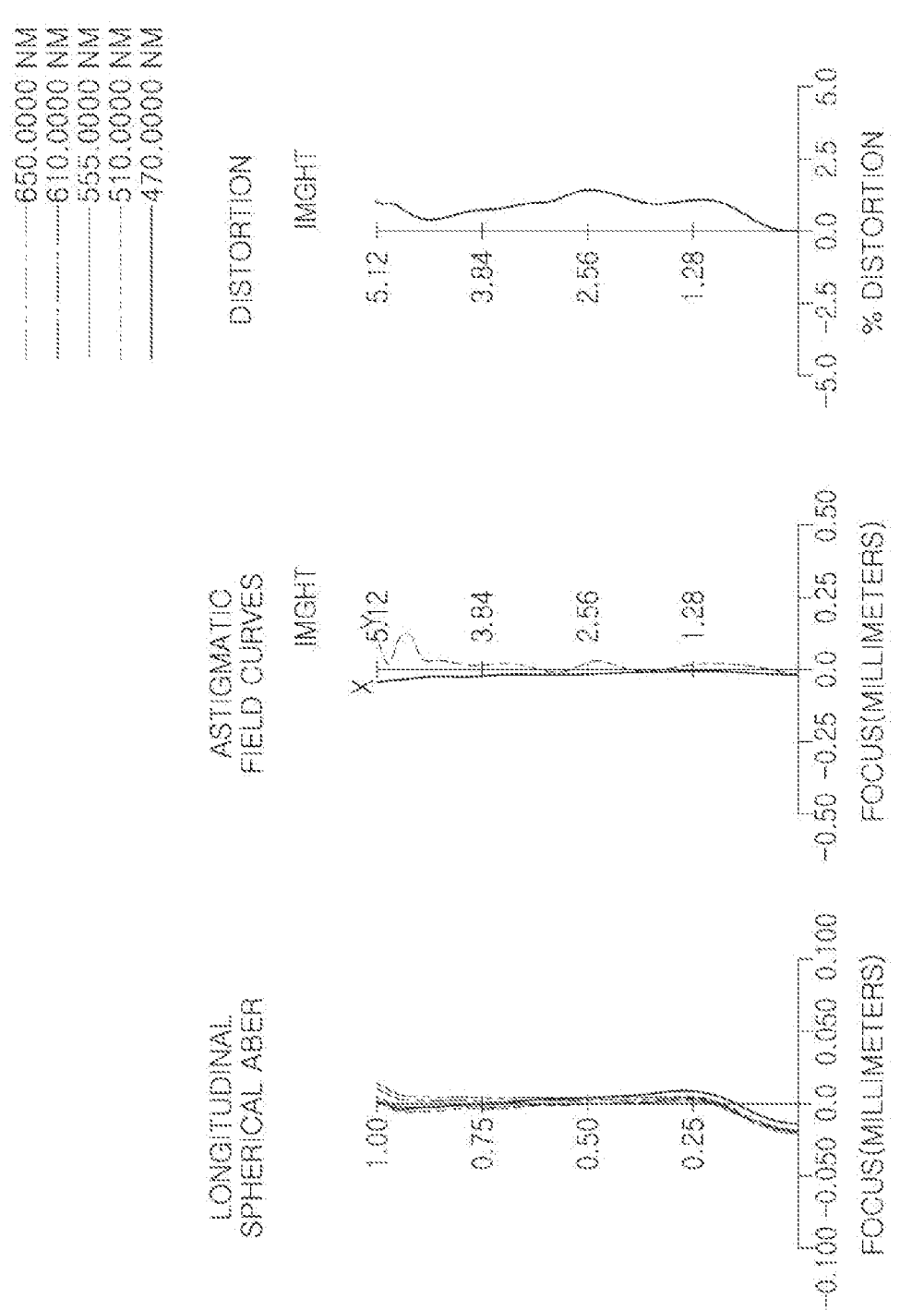
FIG. 8 presents aberration curves of the optical imaging system illustrated in FIG. 7.

The optical imaging system exhibits aberration characteristics as illustrated in FIG. 8. Lens characteristics of the optical imaging system 400 are listed in Table 7, and aspherical characteristics of the optical imaging system 400 are listed in Table 8.

TABLE 7

| Surface No. | Note | Radius of Curvature | Thickness/ Distance | Refractive Index | Abbe Number | Effective Radius |
|---|---|---|---|---|---|---|
| S1 | First Lens | 30.5364 | 0.2600 | 1.5459 | 56.1138 | 1.4700 |
| S2 | | 6.2121 | 0.6694 | | | 1.2185 |
| S3 | Second Lens | 3.9885 | 1.0695 | 1.5459 | 56.1138 | 0.9500 |
| S4 | | −2.5329 | 0.1093 | | | 1.1200 |
| S5 | Third Lens | 7.6667 | 0.2600 | 1.6776 | 19.2459 | 1.2467 |
| S6 | | 2.8571 | 0.8919 | | | 1.3649 |
| S7 | Fourth Lens | −5.9311 | 0.7729 | 1.5459 | 56.1138 | 1.7500 |
| S8 | | −2.1066 | 0.3313 | | | 1.9996 |
| S9 | Fifth Lens | 5.2286 | 0.4000 | 1.5703 | 37.3571 | 2.5834 |
| S10 | | 3.7002 | 0.4345 | | | 3.3568 |
| S11 | Sixth Lens | 1.5138 | 0.4502 | 1.6193 | 25.9599 | 3.9938 |
| S12 | | 1.0265 | 0.4340 | | | 4.2191 |
| S13 | Filter | infinity | 0.2100 | 1.5183 | 64.1973 | 4.7516 |
| S14 | | infinity | 0.6668 | | | 4.8320 |
| S15 | Imaging Plane | infinity | 0.0200 | | | 5.1200 |

Figure 9:
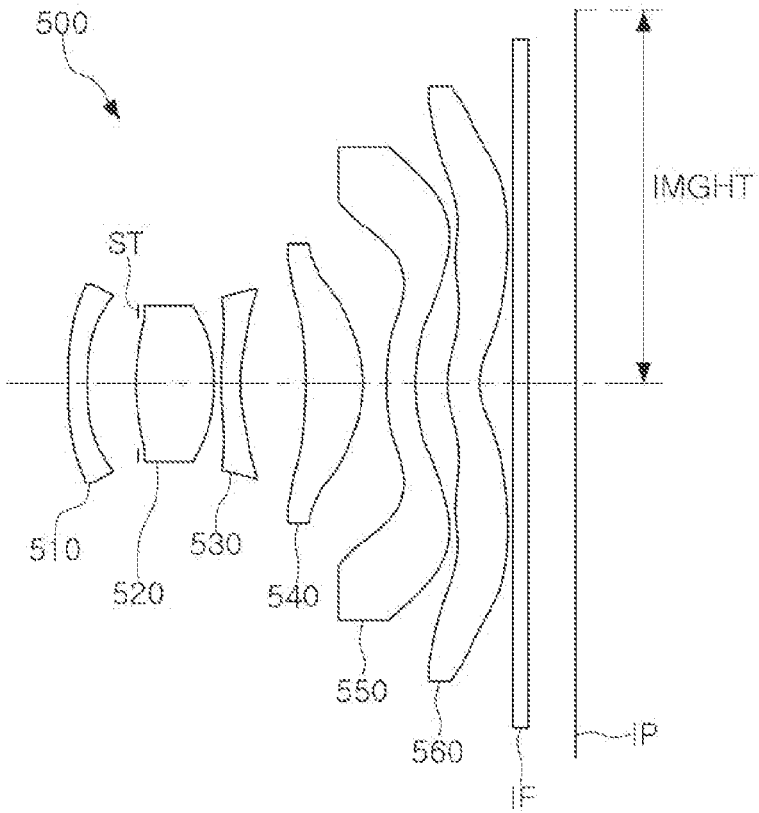
FIG. 9 is a diagram illustrating a fifth example of an optical imaging system.

An optical imaging system according to a fifth example will be described with reference to FIG. 9.

The optical imaging system 500 may include lenses, each having refractive power. For example, the optical imaging system 500 includes a first lens 510, a second lens 520, a third lens 530, a fourth lens 540, a fifth lens 550, and a sixth lens 560.

The first lens 510 may have negative refractive power, and may have a convex object-side surface and a concave image-side surface. The second lens 520 may have positive refractive power, and may have a convex object-side surface and a convex image-side surface. The third lens 530 may have negative refractive power, and may have a convex object-side surface and a concave image-side surface. The fourth lens 540 may have positive refractive power, and may have a concave object-side surface and a convex image-side surface. The fifth lens 550 may have negative refractive power, and may have a convex object-side surface and a concave image-side surface. The fifth lens 550 may have a shape having an inflection point. For example, inflection points may be formed on the object-side surface and the image-side surface of the fifth lens 550. The sixth lens 560 may have negative refractive power and may have a convex object-side surface and a concave image-side surface. The sixth lens 560 may have a shape having an inflection point. For example, inflection points may be formed on the object-side surface and the image-side surface of the sixth lens 560.

The optical imaging system 500 may include a stop ST. For example, the stop ST may be disposed between the first lens 510 and the second lens 520. The optical imaging system 500 may include a filter IF. For example, the filter IF may be disposed between the sixth lens 560 and an imaging

TABLE 8

| Surface No. | S1 | S2 | S3 | S4 | S5 | S6 |
|---|---|---|---|---|---|---|
| K | −3.624.E+01 | 1.721.E+01 | −3.594.E+00 | −1.470.E+00 | −1.696.E+01 | −1.327.E+00 |
| 4th | 9.111.E−02 | 1.337.E−01 | 1.924.E−02 | 2.151.E−02 | −5.806.E−02 | −7.568.E−02 |
| 6th | −2.588.E−03 | −1.872.E−01 | −2.361.E−01 | −2.193.E−01 | 1.683.E−01 | 8.891.E−02 |
| 8th | −2.502.E−01 | 1.275.E+00 | 4.658.E+00 | 1.717.E+00 | −1.142.E+00 | −1.459.E−01 |
| 10th | 1.189.E+00 | −6.837.E+00 | −5.390.E+01 | −1.103.E+01 | 5.660.E+00 | 8.897.E−02 |
| 12th | −3.430.E+00 | 2.580.E+01 | 3.934.E+02 | 5.054.E+01 | −1.949.E+01 | 8.481.E−01 |
| 14th | 6.733.E+00 | −6.952.E+01 | −1.926.E+03 | −1.653.E+02 | 4.783.E+01 | −3.797.E+00 |
| 16th | −9.351.E+00 | 1.357.E+02 | 6.558.E+03 | 3.888.E+02 | −8.552.E+01 | 8.411.E+00 |
| 18th | 9.342.E+00 | −1.934.E+02 | −1.584.E+04 | −6.614.E+02 | 1.126.E+02 | −1.177.E+01 |
| 20th | −6.734.E+00 | 2.008.E+02 | 2.734.E+04 | 8.123.E+02 | −1.092.E+02 | 1.110.E+01 |
| 22nd | 3.469.E+00 | −1.500.E+02 | −3.346.E+04 | −7.121.E+02 | 7.703.E+01 | −7.164.E+00 |
| 24th | −1.245.E+00 | 7.841.E+01 | 2.836.E+04 | 4.340.E+02 | −3.840.E+01 | 3.130.E+00 |
| 26th | 2.958.E−01 | −2.718.E+01 | −1.584.E+04 | −1.746.E+02 | 1.281.E+01 | −8.858.E−01 |
| 28th | −4.176.E−02 | 5.608.E+00 | 5.241.E+03 | 4.167.E+01 | −2.561.E+00 | 1.466.E−01 |
| 30th | 2.653.E−03 | −5.206.E−01 | −7.781.E+02 | −4.466.E+00 | 2.319.E−01 | −1.077.E−02 |

| Surface No. | S7 | S8 | S9 | S10 | S11 | S12 |
|---|---|---|---|---|---|---|
| K | 2.6896.E+00 | −8.4733.E−01 | −6.7403.E−01 | −4.1475.E+00 | −2.0652.E+00 | −1.1067.E+00 |
| 4th | 1.3106.E−02 | 5.6580.E−02 | 1.2012.E−01 | 2.1907.E−02 | −2.4260.E−01 | −3.2266.E−01 |
| 6th | −1.0087.E−02 | 1.3144.E−02 | 2.5726.E−02 | 1.9922.E−01 | 1.2278.E−01 | 1.8260.E−01 |
| 8th | −5.9895.E−03 | −2.9008.E−01 | −2.5628.E−01 | −3.1718.E−01 | −5.1196.E−02 | −8.7618.E−02 |
| 10th | 1.0206.E−02 | 6.6065.E−01 | 3.8317.E−01 | 2.3001.E−01 | 2.0945.E−02 | 3.4525.E−02 |
| 12th | −2.7125.E−03 | −9.0570.E−01 | −3.7030.E−01 | −1.0353.E−01 | −6.8278.E−03 | −1.0367.E−02 |
| 14th | −3.0208.E−02 | 8.6006.E−01 | 2.4958.E−01 | 3.2123.E−02 | 1.5930.E−03 | 2.2906.E−03 |
| 16th | 8.2998.E−02 | −5.8705.E−01 | −1.1823.E−01 | −7.1989.E−03 | −2.6506.E−04 | −3.6921.E−04 |
| 18th | −1.0856.E−01 | 2.9190.E−01 | 3.9584.E−02 | 1.1877.E−03 | 3.1926.E−05 | 4.3332.E−05 |
| 20th | 8.5227.E−02 | −1.0587.E−01 | −9.3783.E−03 | −1.4451.E−04 | −2.8035.E−06 | −3.6856.E−06 |
| 22nd | −4.3010.E−02 | 2.7724.E−02 | 1.5598.E−03 | 1.2804.E−05 | 1.7823.E−07 | 2.2425.E−07 |
| 24th | 1.4131.E−02 | −5.1058.E−03 | −1.7792.E−04 | −8.0225.E−07 | −7.9988.E−09 | −9.4979.E−09 |
| 26th | −2.9339.E−03 | 6.2697.E−04 | 1.3245.E−05 | 3.3632.E−08 | 2.4040.E−10 | 2.6569.E−10 |
| 28th | 3.5067.E−04 | −4.6031.E−05 | −5.7931.E−07 | −8.4509.E−10 | −4.3397.E−12 | −4.4090.E−12 |
| 30th | −1.8434.E−05 | 1.5259.E−06 | 1.1290.E−08 | 9.6113.E−12 | 3.5550.E−14 | 3.2851.E−14 | plane IP. The filter IF may block light of specific wavelengths from being incident. For example, the filter IF according to the fifth example may block infrared light from being incident to the imaging plane IP.

Figure 10:
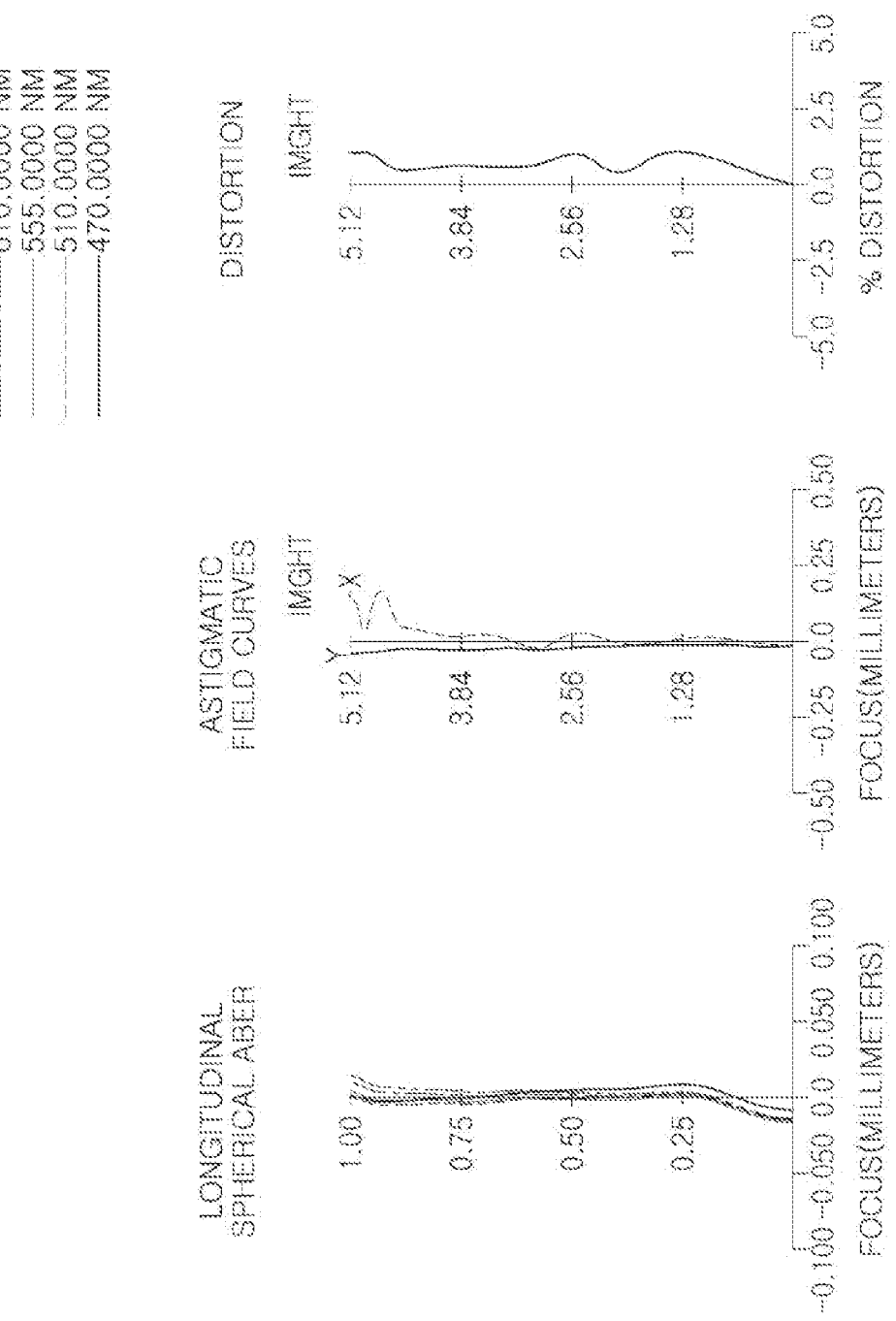
FIG. 10 presents aberration curves of the optical imaging system illustrated in FIG. 9.

The optical imaging system 500 exhibits aberration characteristics as illustrated in FIG. 10. Lens characteristics of the optical imaging system 500 are listed in Table 9, and aspherical characteristics of the optical imaging system 500 are listed in Table 10.

TABLE 9

| Surface No. | Note | Radius of Curvature | Thickness/ Distance | Refractive Index | Abbe Number | Effective Radius |
|---|---|---|---|---|---|---|
| S1 | First Lens | 26.8543 | 0.2600 | 1.5459 | 56.1138 | 1.4700 |
| S2 | | 6.6911 | 0.6469 | | | 1.2287 |
| S3 | Second Lens | 4.1358 | 1.0556 | 1.5459 | 56.1138 | 0.9600 |
| S4 | | −2.6137 | 0.0935 | | | 1.1200 |

TABLE 9-continued

| Surface No. | Note | Radius of Curvature | Thickness/ Distance | Refractive Index | Abbe Number | Effective Radius |
|---|---|---|---|---|---|---|
| S5 | Third Lens | 6.6378 | 0.2600 | 1.6776 | 19.2459 | 1.2395 |
| S6 | | 2.7410 | 0.9337 | | | 1.3498 |
| S7 | Fourth Lens | −5.7522 | 0.7537 | 1.5459 | 56.1138 | 1.7500 |
| S8 | | −2.0430 | 0.3140 | | | 1.9966 |
| S9 | Fifth Lens | 4.7954 | 0.4038 | 1.5703 | 37.3571 | 2.5562 |
| S10 | | 3.3664 | 0.5373 | | | 3.3236 |
| S11 | Sixth Lens | 1.7301 | 0.4500 | 1.6193 | 25.9599 | 4.0434 |
| S12 | | 1.0955 | 0.3744 | | | 4.2712 |
| S13 | Filter | infinity | 0.2100 | 1.5183 | 64.1973 | 4.7666 |
| S14 | | infinity | 0.6705 | | | 4.8452 |
| S15 | Imaging Plane | infinity | 0.0160 | | | 5.1200 |

TABLE 10

| Surface No. | S1 | S2 | S3 | S4 | S5 | S6 |
|---|---|---|---|---|---|---|
| K | −9.900.E+01 | 1.743.E+01 | −3.128.E+00 | −1.561.E+00 | −1.683.E+01 | −1.427.E+00 |
| 4th | 9.976.E−02 | 1.367.E−01 | 1.649.E−02 | 1.023.E−02 | −7.144.E−02 | −8.558.E−02 |
| 6th | −1.047.E−01 | −2.049.E−01 | −1.275.E−01 | −8.891.E−02 | 2.186.E−01 | 1.005.E−01 |
| 8th | 3.119.E−01 | 1.186.E+00 | 2.759.E+00 | 5.536.E−01 | −1.163.E+00 | −1.012.E−01 |
| 10th | −7.573.E−01 | −5.271.E+00 | −3.353.E+01 | −3.138.E+00 | 4.897.E+00 | −1.988.E−01 |
| 12th | 1.192.E+00 | 1.670.E+01 | 2.498.E+02 | 1.297.E+01 | −1.475.E+01 | 1.718.E+00 |
| 14th | −1.102.E+00 | −3.837.E+01 | −1.230.E+03 | −3.999.E+01 | 3.160.E+01 | −5.633.E+00 |
| 16th | 3.311.E−01 | 6.483.E+01 | 4.180.E+03 | 9.157.E+01 | −4.871.E+01 | 1.140.E+01 |
| 18th | 5.446.E−01 | −8.114.E+01 | −1.002.E+04 | −1.539.E+02 | 5.446.E+01 | −1.554.E+01 |
| 20th | −8.679.E−01 | 7.502.E+01 | 1.710.E+04 | 1.874.E+02 | −4.423.E+01 | 1.469.E+01 |
| 22nd | 6.367.E−01 | −5.053.E+01 | −2.064.E+04 | −1.626.E+02 | 2.587.E+01 | −9.669.E+00 |
| 24th | −2.826.E−01 | 2.406.E+01 | 1.723.E+04 | 9.762.E+01 | −1.065.E+01 | 4.349.E+00 |
| 26th | 7.755.E−02 | −7.665.E+00 | −9.464.E+03 | −3.850.E+01 | 2.934.E+00 | −1.276.E+00 |
| 28th | −1.218.E−02 | 1.463.E+00 | 3.076.E+03 | 8.966.E+00 | −4.884.E−01 | 2.203.E−01 |
| 30th | 8.398.E−04 | −1.262.E−01 | −4.484.E+02 | −9.344.E−01 | 3.726.E−02 | −1.697.E−02 |

| Surface No. | S7 | S8 | S9 | S10 | S11 | S12 |
|---|---|---|---|---|---|---|
| K | 2.343.E+00 | −9.433.E−01 | −1.721.E+00 | −4.475.E+00 | −1.949.E+00 | −1.097.E+00 |
| 4th | 1.817.E−02 | 6.593.E−02 | 1.213.E−01 | 3.249.E−02 | −2.718.E−01 | −3.413.E−01 |
| 6th | −7.074.E−02 | −1.574.E−02 | −1.884.E−03 | 1.674.E−01 | 1.801.E−01 | 2.306.E−01 |
| 8th | 3.219.E−01 | −2.128.E−01 | −1.978.E−01 | −2.772.E−01 | −1.051.E−01 | −1.294.E−01 |
| 10th | −9.761.E−01 | 5.421.E−01 | 3.118.E−01 | 1.993.E−01 | 5.038.E−02 | 5.362.E−02 |
| 12th | 1.898.E+00 | −8.081.E−01 | −3.145.E−01 | −8.742.E−02 | −1.703.E−02 | −1.568.E−02 |
| 14th | −2.541.E+00 | 8.335.E−01 | 2.205.E−01 | 2.612.E−02 | 3.970.E−03 | 3.260.E−03 |
| 16th | 2.437.E+00 | −6.155.E−01 | −1.079.E−01 | −5.583.E−03 | −6.510.E−04 | −4.889.E−04 |
| 18th | −1.703.E+00 | 3.290.E−01 | 3.706.E−02 | 8.707.E−04 | 7.647.E−05 | 5.342.E−05 |
| 20th | 8.683.E−01 | −1.274.E−01 | −8.953.E−03 | −9.922.E−05 | −6.482.E−06 | −4.255.E−06 |
| 22nd | −3.192.E−01 | 3.536.E−02 | 1.510.E−03 | 8.146.E−06 | 3.940.E−07 | 2.443.E−07 |
| 24th | 8.233.E−02 | −6.857.E−03 | −1.740.E−04 | −4.668.E−07 | −1.677.E−08 | −9.833.E−09 |
| 26th | −1.412.E−02 | 8.810.E−04 | 1.303.E−05 | 1.758.E−08 | 4.751.E−10 | 2.632.E−10 |
| 28th | 1.446.E−03 | −6.730.E−05 | −5.710.E−07 | −3.872.E−10 | −8.050.E−12 | −4.205.E−12 |
| 30th | −6.685.E−05 | 2.310.E−06 | 1.110.E−08 | 3.723.E−12 | 6.176.E−14 | 3.031.E−14 |

Optical characteristic values and conditional expression values of the optical imaging systems according to the first to fifth examples are listed in Table 11 and Table 12.

TABLE 11

| Note | First Example | Second Example | Third Example | Fourth Example | Fifth Example |
|------|---------------|----------------|---------------|----------------|---------------|
| f number | 2.250 | 2.250 | 2.240 | 2.250 | 2.280 |
| TTL | 7.000 | 7.000 | 7.000 | 7.000 | 7.000 |
| IMGHT | 5.120 | 5.120 | 5.120 | 5.120 | 5.120 |
| FOV | 100.027 | 100.135 | 100.132 | 102.967 | 101.026 |
| f | 4.3025 | 4.2926 | 4.2930 | 4.0212 | 4.1651 |
| f1 | 14.0834 | 8.7426 | 8.9069 | −14.3391 | −16.3982 |
| f2 | −27.9775 | −20.5946 | −20.4912 | 3.0120 | 3.1052 |
| f3 | 4.7498 | 5.7278 | 6.1396 | −6.8717 | −7.0818 |
| f4 | −6.4570 | −6.4150 | −6.9766 | 5.5856 | 5.4151 |
| f5 | 4.091 | 3.414 | 3.389 | −24.525 | −22.073 |
| f6 | −5.2470 | −3.8402 | −4.1105 | −7.9617 | −6.6168 |

TABLE 12

| Conditional Expression | First Example | Second Example | Third Example | Fourth Example | Fifth Example |
|------------------------|---------------|----------------|---------------|----------------|---------------|
| (IMGHT/(f*tan(FOV/2)) − 1)*100 | −0.1948 | −0.1569 | −0.1601 | 1.3384 | 1.2864 |
| f1/f3 | 2.9648 | 1.5264 | 1.4507 | 2.0866 | 2.3154 |
| f3/f4 | −0.7356 | −0.8929 | −0.8800 | −1.2302 | −1.3078 |
| |f4/f6| | 1.2306 | 1.6706 | 1.6976 | 0.7016 | 0.8183 |
| f3/f5 | 1.1611 | 1.6778 | 1.8117 | 0.2802 | 0.3208 |
| TTL/IMGHT | 1.3574 | 1.3578 | 1.3576 | 1.3631 | 1.3633 |

As described above, an optical imaging system having a field of view of 100 degrees or more and f number of 2.3 or less may be implemented.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having positive refractive power and having a convex image-side surface in a paraxial region thereof;
a second lens having refractive power and having a convex object-side surface;
a third lens having refractive power and having a convex object-side surface;
a fourth lens having refractive power;
a fifth lens having refractive power and having a convex object-side surface in a paraxial region thereof; and
a sixth lens having negative refractive power, wherein the first to sixth lenses are disposed in order from an object side,
wherein $$100° \leq FOV$$

$$−2.0 < \{IMGHT/(f*\tan(FOV/2)) − 1\}*100 < 2.0,$$

where FOV is a field of view of the optical imaging system, IMGHT is half of a diagonal length of an imaging plane, and f is a focal length of the optical imaging system,
wherein R8>R1, where R8 is a value of a radius of curvature of an image-side surface of the fourth lens and R1 is a value of a radius of curvature of an object-side surface of the first lens,
wherein R7>R6, where R7 is a value of a radius of curvature of an object-side surface of the fourth lens and R6 is a value of a radius of curvature of an image-side surface of the third lens,
wherein a thickness of the fourth lens is greater than a thickness of the first lens,
wherein a distance from an image-side surface of the fifth lens to an object-side surface of the sixth lens is greater than a distance from an image-side surface of the second lens to an object-side surface of the third lens, and
wherein the distance from the image-side surface of the fifth lens to the object-side surface of the sixth lens is greater than the thickness of the first lens.

2. The optical imaging system of claim 1, wherein the first lens has a concave object-side surface.

3. The optical imaging system of claim 1, wherein the fourth lens has a concave object-side surface.

4. The optical imaging system of claim 1, wherein the sixth lens has a convex object-side surface.

5. The optical imaging system of claim 1, wherein the sixth lens has a concave image-side surface.

6. The optical imaging system of claim 1, wherein $$−1.5 < f3/f4 < −0.7,$$

where f4 is a focal length of the fourth lens.

7. The optical imaging system of claim 1, wherein $$0.6 < |f4/f6| < 1.8,$$

where f4 is a focal length of the fourth lens, and f6 is a focal length of the sixth lens.

8. The optical imaging system of claim 1, wherein $$1.3 < TTL/IMGHT < 1.4,$$

where TTL is a distance from the object-side surface of the first lens to the imaging plane.

9. The optical imaging system of claim 1, wherein 1.8< f number <2.3, where f number is an f number of the optical imaging system.

10. An optical imaging system comprising:
a first lens having positive refractive power and having a convex image-side surface in a paraxial region thereof;
a second lens having refractive power and having a convex object-side surface;
a third lens having refractive power and having a convex object-side surface;
a fourth lens having refractive power;
a fifth lens having refractive power and having a convex object-side surface in a paraxial region thereof; and
a sixth lens having refractive power,
wherein the first to sixth lenses are disposed in order from an object side, wherein $100° \leq FOV$, and $-2.0 < \{IMGHT/(f*\tan(FOV/2))-1\}*100 < 2.0,$ where FOV is a field of view of the optical imaging system, IMGHT is half of a diagonal length of an imaging plane, and f is a focal length of the optical imaging system, wherein R8>R1, where R8 is a value of a radius of curvature of an image-side surface of the fourth lens and R1 is a value of a radius of curvature of an object-side surface of the first lens, wherein R7>R6, where R7 is a value of a radius of curvature of an object-side surface of the fourth lens and R6 is a value of a radius of curvature of an image-side surface of the third lens, wherein a thickness of the fourth lens is greater than a thickness of the first lens, wherein a distance from an image-side surface of the fifth lens to an object-side surface of the sixth lens is greater than a distance from an image-side surface of the second lens to an object-side surface of the third lens, and wherein the distance from an image-side surface of the fifth lens to an object-side surface of the sixth lens is greater than the thickness of the first lens.

11. The optical imaging system of claim 10, wherein the first lens has refractive power having a sign different from a sign of the refractive power of the second lens.

12. The optical imaging system of claim 10, wherein the fourth lens has refractive power having a sign different from a sign of the refractive power of the fifth lens.

13. The optical imaging system of claim 10, wherein the sixth lens has negative refractive power.

14. The optical imaging system of claim 10, wherein the sixth lens has a convex object-side surface.

15. The optical imaging system of claim 10, wherein $1.0 < f1/f3 < 3.0,$ where f1 is a focal length of the first lens.

16. The optical imaging system of claim 10, wherein TTL/IMGHT<1.4, where TTL is a distance from the object-side surface of the first lens to the imaging plane.

\* \* \* \* \*